Jan. 31, 1967 SHAO-CHI LIN 3,302,127
GAS LASER AND METHOD OF OPERATION
Filed April 30, 1963 4 Sheets-Sheet 1

SHAO-CHI LIN
INVENTOR.

BY Alden D. Redfield
Melvin E. Frederick
ATTORNEYS

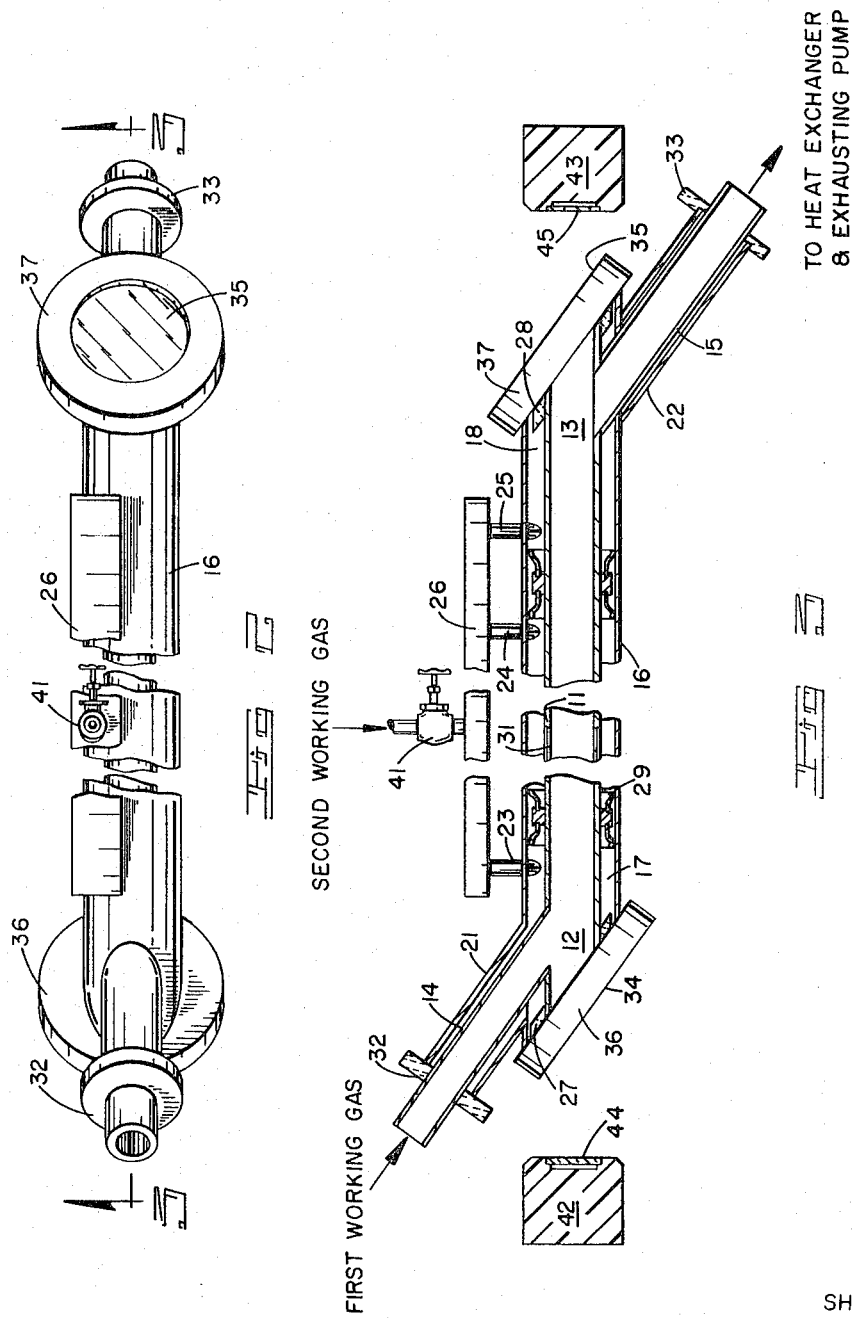

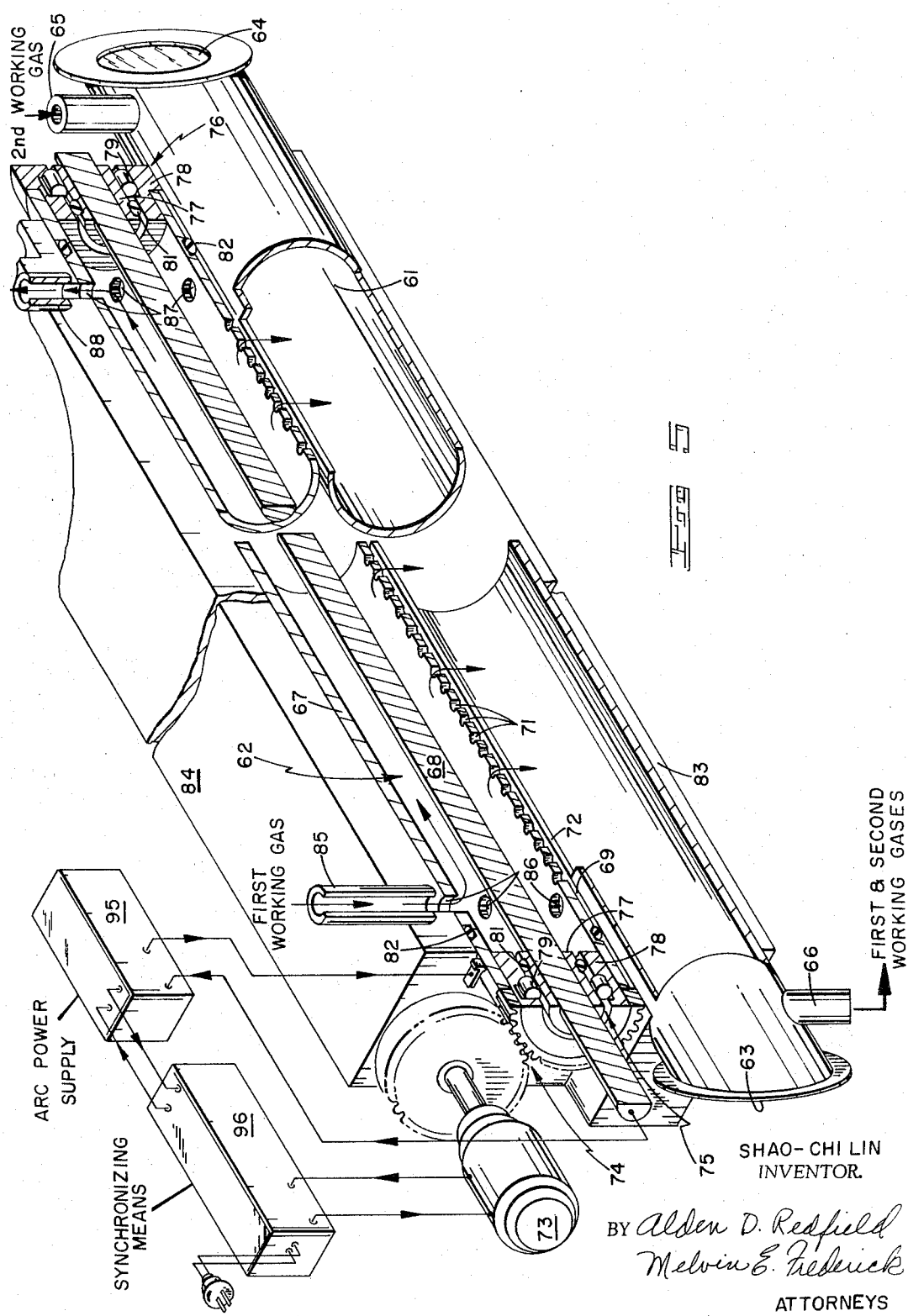

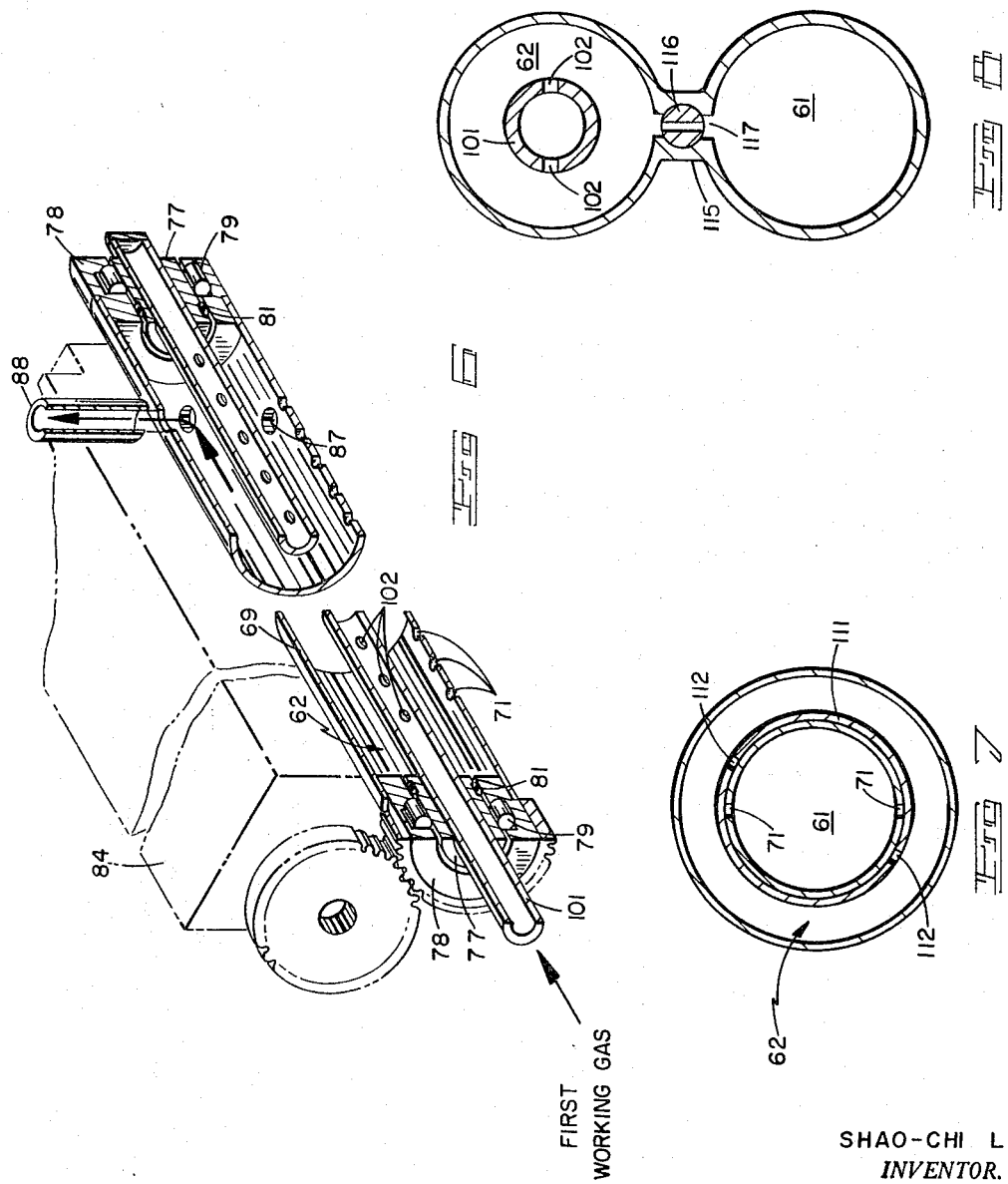

United States Patent Office 3,302,127
Patented Jan. 31, 1967

3,302,127
GAS LASER AND METHOD OF OPERATION
Shao-Chi Lin, Lexington, Mass., assignor to Avco Corporation, Cincinnati, Ohio, a corporation of Delaware
Filed Apr. 30, 1963, Ser. No. 276,843
6 Claims. (Cl. 331—94.5)

The present invention relates to methods of and apparatus for the generation and amplification of infrared, visible and ultraviolet light waves, and more particularly to the generation and amplification of such waves by means of devices including media in which stimulated emission of radiation occurs.

Light amplification by stimulated emission of radiation (laser) has extended the range of controlled electromagnetic radiation to the infrared and visible light spectrum. A laser produces a beam of coherent electromagnetic radiation having a particular well-defined frequency in that region of the spectrum broadly described as optical. This range includes the near ultraviolet, the visible and the infrared. The coherence of the beam is particularly important because it is that property which distinguishes laser radiation from ordinary optical beams. On account of its coherence, a laser beam has remarkable properties which set it apart from ordinary light which is incoherent. While the maser (microwave amplification by stimulated emission of radiation) and the laser are based on the same principles of statistical and quantum mechanics, the problems of and the physical embodiments for achieving laser action are completely different from those for masers.

Coherence, the essential property of lasers, is of two kinds: spatial and temporal. A wave is spatially coherent over a time interval if there exists a surface over which the phase of the wave is the same (or is correlated) at all points. A wave is time-coherent at an infinitesimal area on a receiving surface if there exists a periodic relationship between its amplitude at any one instant and its amplitude at later instants of time. Perfect time coherence is an ideal since it implies perfect monochromaticity, something which is forbidden by the uncertainty principle.

Laser beams have a number of remarkable properties. Because of their spatial coherence, they have an extremely small divergence and are therefore highly directional. For example, a ruby laser beam one inch in diameter at the source will be about four feet across on a surface ten miles away. The very best that could be accomplished over the same distance with an incoherent source, such as an arc lamp at the focus of a six-foot parabolic mirror, would be a beam spread over an area more than one-third of a mile across. Another important feature of lasers is the enormous power that can be generated in a very narrow wave length range. Under certain operating conditions, monochromatic bursts of millions of watts can be produced. To get comparable radiation intensity from a black body, it would have to be raised to a temperature of hundreds of millions of degrees—a condition not practically achievable. A laser beam, because it possesses space coherence, can be focused to form a spot whose diameter is of the order of one wave length of the laser light itself. Enormous power densities are thus attainable. For example, the focused output of a 50-kilowatt infrared burst from a laser can have a radiant power density of the order of $10^{12}$ watts/cm.$^2$; this is about 100 million times the power density at the surface of the sun. Extraordinarily high temperatures, orders of magnitude greater than that at the sun, can be generated at the small area which absorbs this concentrated radiation. Furthermore, since the electric filed strength of an electromagnetic wave is proportional to the square root of its intensity, the field at the focus of the laser beam is millions of volts per centimeter. The most promising potential of lasers comes from time coherence. It is this property which permitted prior art exploitation of radio and microwaves for communications. However, laser frequencies are millions of times higher than radio frequencies, and hence are capable of carrying up to millions of times more information. In fact, one single laser beam has in principle more information-carrying capacity than all the combined radio and microwave frequencies in use at the present time.

Accordingly, systems applications of lasers are useful for communication in space, on earth and undersea. Military surveillance and weapons systems, mapping, medical, and computer technology may also include lasers.

Two conditions must be fulfilled in order to bring about laser action: (1) population inversion must be achieved and (2) an avalanche process of photon amplification must be established in a suitable cavity such as, for example, an optical cavity. The meaning of population inversion and the basic processes leading to it may be understood by the following discussion. Consider two energy levels $E_0$ and $E_2$ in an atom (which may exist in a gas or solid medium) where $E_0$ is the normal or ground state and $E_2$ is a higher-lying energy state. Any transition between these states involves, according to Planck's law, the emission or absorption of a photon of value $h\nu_{02}$ where $h$ is Planck's constant and $\nu_{02}$ is the frequency characteristic of the particular transition. At ordinary temperatures all atoms tend to be in their lowest state $E_0$ and the upper energy state $E_2$ is unoccupied. This condition will be changed, however, if a photon of energy exactly $h\nu_{02}$ impinges on the system since this photon will be absorbed by one of the atoms which will then be raised to the excited state $E_2$. An excited state of an atom is unstable and after a short time, the atom will, without any external stimulus, make a transition to the ground state giving off a photon of energy $h\nu_{02}$. This process is called spontaneous emission. The lifetime for spontaneous emission is an average value, and the precise value for a single excited atomic system cannot be known, because in an assembly of identical excited atoms there will be a spread of values. For different atomic systems, the value of the average lifetime of the excited state varies considerably, ranging typically from $10^{-8}$ second to $10^{-3}$ second. If a photon of energy $h\nu_{02}$ falls on an atom while it is still in the excited state, the atom is immediately stimulated to make its transition to the ground state and gives off a photon $h\nu_{02}$ which is additional to the one which triggered its emission. This process is called stimulated emission. It is significant that the radiation produced by stimulated emission is in phase with the radiation which stimulated it.

Consider now a system of very many atoms with levels $E_0$ and $E_2$. Photons $h\nu_{02}$ incident on such a system with all or most of the atoms in the ground state $E_0$ tend to be absorbed, thereby raising atoms to the excited state $E_2$; generally, the greater the number of incident photons the greater the number of atoms raised to the excited state. However, there is a limit to this process because of two factors: (1) atoms in state $E_2$ tend to revert to the ground state $E_0$ without any external stimulus (spontaneous emission); and (2) atoms in excited state $E_2$ are stimulated to revert to the ground state by their interaction with incident photons (stimulated emission). In the limit, no matter how great the incident photon flux, not more than 50% of the atoms can be forced into the excited state because the incident photons are just as likely to stimulate excited atoms to revert to the ground state as they are to cause ground state atoms to become excited. Population inversion, the condition where more atoms are in the excited state $E_2$ than in the ground state $E_0$, accordingly cannot be achieved in such a system.

Population inversion, the first previously noted necessary condition for laser action, can be accomplished if (1) the atomic system has at least three levels (one ground and at least two excited levels) which can be involved in the absorption and emission processes and (2) the spontaneous emission lifetime of one of the excited states is much longer than that of the other or others. Consider now an atom with three energy levels $E_0$, $E_1$, and $E_2$, where $E_1$ lies between the ground state $E_0$ and an upper excited state $E_2$; the atom in excited state $E_2$ relaxes to its ground state by first making a transition to $E_1$ and then a transition from $E_1$ to $E_0$ (with the emission of a photon $h\nu_{01}$); and the lifetime of excited state $E_1$ is very much longer than that of $E_2$ (by factor of 1000, for example). If now a stream of photons of energy $h\nu_{02}$ impinges on such a system, many of the atoms will be raised to state $E_2$. In some short interval of time, these atoms will spontaneously make the transition to $E_1$. They will, on the average, remain in this state for a relatively long time (of the order, say, of milliseconds) before reverting spontaneously to the lowest energy state $E_0$. One can take advantage of the long lifetime of state $E_1$ to bring about population inversion of state $E_1$ with respect to $E_0$, that is to create a condition where the number of atoms in excited state $E_1$ exceeds that in the lower lying level $E_0$. Under the influence of a very intense flux of photons $h\nu_{02}$ a large proportion of atoms will be raised to state $E_2$. Many of these will relax to the state $E_1$, thereby creating a population in this level. Photons of energy $h\nu_{02}$ are not capable of stimulating the emission from level $E_1$; hence, on account of its long lifetime for spontaneous emission, the population in this level increases. If the incident flux $h\nu_{02}$ is made sufficiently intense over a long enough period of time, atoms initially excited from state $E_0$ to $E_2$ will accumulate in level $E_1$ to such an extent that its population will exceed that of $E_0$ and population inversion will be achieved.

If now photons of energy $h\nu_{01}$ are incident on a system where the population of level $E_1$ is inverted with respect to $E_0$, stimulated emission will exceed absorption and more photons $h\nu_{01}$ will leave the system than entered it. Such a phenomenon is called photon or quantum amplification which is the essential process in all lasers and masers; in the latter $\nu_{01}$ is a microwave frequency. In either case, $\nu_{02}$ is called the pumping frequency.

When the system is in a condition where light (photon) amplification is possible, laser action can be achieved by providing (1) means for stimulating photon emission from the long-lived state $E_1$, and (2) means for causing photon amplification to build up to extremely high values. In the usual embodiment, this is accomplished by fashioning the medium containing the active atoms into a cylinder with perfectly (as far as possible) parallel ends polished so highly that the surface roughness is measured in terms of small fractions of a wave length of light. The ends are silvered or dielectric coated to behave as mirrors which reflect photons coming toward them from the interior of the cylinder. Such a structure, whether the mirrors are within or outside the container, is called an optical cavity. If now pumping means, such as for example an intense light source, acts on the medium and brings about population inversion of $E_1$ with respect to $E_0$, even though $E_1$ is relatively long-lived, in a small fraction of a second there will be spontaneous emission of photons $h\nu_{01}$. Most of these photons will be lost to the medium, but some of them will travel perpendicular to the ends and be reflected back and forth many times by the mirrors. As these photons traverse the active medium, they stimulate emission of photons $h\nu_{01}$ from all atoms in excited state $E_1$ which they encounter. In this way, the degree of light amplification in the medium increases extraordinarily and because the photons produced by stimulated emission have the same direction and phase as those which stimulate them, the electromagnetic radiation field inside the cylinder or cavity is coherent. In order to extract a useful beam of this coherent light from the cavity, one (or both) of the mirrors is made slightly transmissive. A portion of the highly intense beam leaks through the mirror, and emerges with plane-parallel, regularly spaced wavefronts. This is the laser beam.

The establishment of in-phase back-and-forth motion of the photons in the optical cavity parallel to its axis is equivalent to the setting up of an electromagnetic standing wave of frequency $\nu_{01}$ between the two reflecting ends. A standing wave has nodes at its ends and can exist only if it is made up of an integral number of half-wave lengths. If the wave length of the beam is, for example, $10^{-4}$ centimeter (corresponding to $$\nu_{01} = 3 \times 10^{14}$$

cycles per seconds), this leads to exceedingly stringent geometrical requirements. Suppose, for example, that one or both mirrors have surface irregularities (that is, deviations from perfect flatness). In such case, the perpendicular distance from one mirror to the other cannot be precisely the same at all points. A standing wave can be supported in the cavity for mirror separations different from the required distance if the difference is precisely an integral number of half-wave lengths. Accordingly, if deviations of the mirrors from flatness are extensive, the distance between mirrors will not satisfy the separtaion distance requirement at too many points and laser action will not be achievable. Additionally, deviations from flatness of the mirror surfaces cause reflections which are not parallel to the incident direction and such reflected light rays tend to leave the cavity through the side walls thereof. Surface flatness is typically specified to be within 1/10 or 1/20 of a wave length of light, and frequently to within 1/100. By normal high quality standards, these are fantastic tolerances, deviations from perfect flatness being less than one one-millionth of an inch. However, satisfactory flatness can be achieved in conventional manner as by lapping and polishing.

Parallelism of the mirrors is another rigorous geometrical requirement. If the mirrors are not precisely parallel, the light rays that build up in the cavity will tend to digress further and further toward the edges of the mirrors as they are reflected back and forth between the mirrors, and finally they will be directed out of the cavity altogether. It is essential that any deviations from parallelism be so small that the coherent photon streams will reflect back and forth a very large number of times to build up the required intensity for laser action. In a conventional well-made laser cylinder, the angle that one mirror makes with the other (called wedge angle) is about two seconds, or about 1/2000 of a degree. Satisfactory wedge angles may be achived, for example, with micrometer adjustments. Use of spherical mirrors eases somewhat the rigorous requirements for keeping the still-amplifying beam in the cavity because spherical surfaces of the proper radius tend to reflect off-axis beams toward the center of the cavity. The laser radiation which emerges from a spherical mirror has spherical wave fronts and thus is divergent. However, since such coherent wave fronts appear to originate from a common center, they can be, by use of a lens, made plane-parallel and hence, except for diffraction effects, non-divergent.

A continuously operating gas laser is disclosed in an article entitled, "Population Inversion and Continuous Optical Maser Oscillation in a Gas Discharge Containing He-Ne Mixture," Physical Review Letters, 6, page 106, 1961. In the usual embodiment of prior art gas laser, the gas is statically contained in a tube about 100 centimeters long. The mirrors which form the ends of the optical cavity are disposed either inside the tube or external to it. The energy level scheme for lasing is shown in FIGURE 1. Pumping is accomplished in this system by electrical excitation (either radio frequency or direct current) of helium atoms from their ground state to the $2^1S$ and $2^3S$ levels. These levels have very closely the same energy value as the $2s$ and $3s$ levels of neon as shown in FIGURE 1. When a helium atom in the $2^1S$ or $2^3S$ state collides with a ground state neon atom, there is a high probability for the energy of the helium atom to be transferred to the neon atom (resonant energy transfer), raising the neon atom to a $3s$ or $2s$ state while the helium returns simultaneously to its ground state. Electron impact (by electrons originating from ionization of the gases) also contribute to the excitation of neon atoms to the $2s$ and $3s$ states. Population inversion can thus be established with respect to the transitions from $3s$ to $3p$ (3.39 microns), $3s$ to $2p$ (6328 A.), and $2s$ to $2p$ (1.15 microns) under favorable conditions. Laser action at any one of these wave lengths can be achieved by using as mirrors multilayer dielectric coatings designed specifically to give peak reflectivity at that wave length. It may be noted that the lower energy states $3p$ and $2p$ of the neon atoms involved in these laser lines are actually intermediate electronic states rather than the ground electronic state as previously discussed.

In addition to the helium-neon gas laser system, other gas laser systems, all with outputs in the infrared, have been achieved with helium, neon, argon, krypton, xenon, oxygen, and cesium (the last optically pumped in the gaseous state) as the emitting atoms.

Recently, exceptionally high gain (photon amplification per unit length) has been achieved in two gas laser systems: the 3.39-micron helium-neon emission and the 2.03-micron output from a helium-xenon mixture. High gain in a gas laser makes possible two significant advances: (1) fabrication of gas lasers with dimensions comparable to those of solid lasers; and (2) the realization, for the first time, of a useful optical amplifier. The latter is merely the excited gas mixture without the mirrors. When an external light beam passes through the active mixture of an optical amplifier, atoms in the proper excited state are stimulated to emit, thereby increasing the photon flux. In such a device, the wave length of the incident light which is to be amplified must be precisely matched to that which results from the stimulated emission process; for example, a helium-xenon amplifier is specific for the amplification of 2.03-micron radiation. Optical amplifiers are useful as part of a practical laser communications system.

From the above, it will now be evident that in prior art gas lasers, the excited atom population inversion needed for laser action was obtained from the combined effect of a favorable preferential excitation of the upper energy states by electron impact either directly or indirectly through resonance energy transfer, and a preferential de-excitation or de-population of the intermediate and lower energy states by spontaneous emission of radiation and atomic diffusion to the containing walls of the discharge tube. Because of the fact that excitation of the upper energy state and de-excitation of the intermediate and lower energy states all occurred within approximately the same region of the discharge tube, the degree of population and inversion as well as the excited atom number density obtainable by these static methods are quite limited. Consequently, prior art apparatus and methods suffered from the disadvantage that coherent light power output thus produced is generally quite small.

Accordingly, it is an object of the present invention to provide an improved method of and apparatus for the production in a gas laser of molecule population inversion.

Another object of the present invention is to provide a continuous flow gas laser.

A further object of the present invention is to provide a laser wherein the excitation region is separated from the population inversion region.

A still further object of the present invention is to provide a gas laser having a degree of population inversion greater than that obtainable by lasers utilizing a static gas.

Another object of the present invention is to provide a gas laser wherein the undesirable effect of re-population in the intermediate and lower energy states involved in the laser action by direct electron impact excitation from the ground state can be minimized.

A still further object of the present invention is to provide a practically reliable and efficient laser structure which is capable of the generation of monochromatic radiation, or coherent amplification, in the infrared, visible and ultraviolet portions of the electromagnetic spectrum.

The above and other objects of the present invention are realized in an illustrative embodiment of the present invention wherein excited atoms or molecule population inversion in a working gas is produced in an excitation region and continuously introduced into one end of a mixing region separate from the aforementioned excitation region. The working gas is introduced at one end of the mixing region and exhausted at the opposite end thereof. As the working gas flows through the mixing region, it is uniformly mixed with a second and different gas to produce a mixture ratio which, in combination with an optical system disposed at the extremities of the mixing region, results in laser action.

The principles of the present invention will be better understood from the following more detailed discussion taken in conjunction with the accompanying drawings, in which:

FIGURE 2 is a top view of a laser device in accordance with the principles of the present invention;

FIGURE 3 is a side view partly in section of the laser shown in FIGURE 2 with mirrors;

FIGURE 5 is a perspective view partly in section of a pulsed laser in accordance with the present invention;

FIGURE 6 shows a modification of the laser shown in FIGURE 5;

FIGURE 7 illustrates another modification of the laser shown in FIGURE 5; and

FIGURE 8 illustrates still another modification of the laser shown in FIGURE 5.

Figure 1:
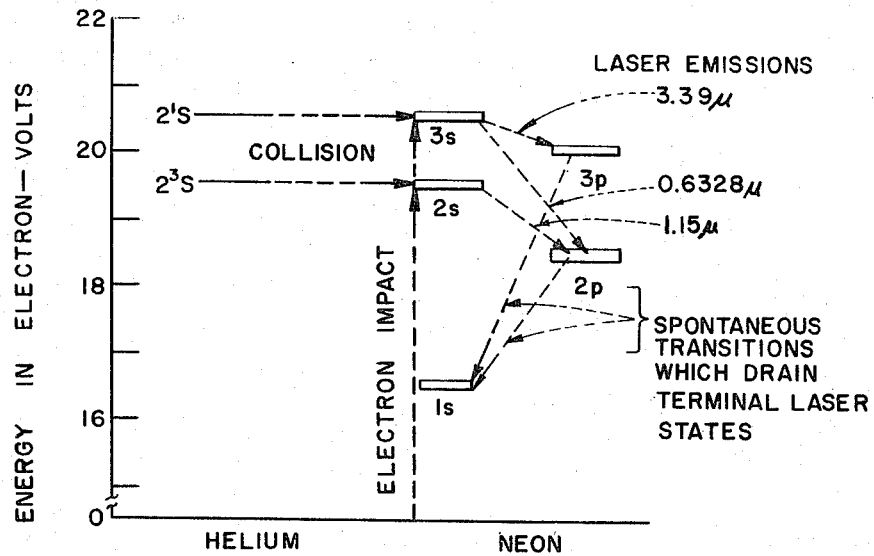
FIGURE 1 is an energy level diagram for a helium-neon laser system.

With reference now to FIGURE 2, there is shown a laser device comprising an elongated foraminous tube or lasing chamber 11 open at its ends 12 and 13 and having a gas inlet port 14 adjacent one end and a gas outlet port 15 adjacent the other end. The gas ports 14 and 15 may be disposed at an angle of, for example, 34° to the longitudinal axis of the tube to minimize overall flow resistance through the lasing chamber 11. The lasing chamber 11, which may be composed of a porous heat resistant ceramic having a low coefficient of expansion such as, for example, Alundum, manufactured by the Norton Company, is coaxially disposed within an outer tube 16 of quartz or the like which also has a low coefficient of expansion. The outer tube 16, which need not be transparent, is open at its ends 17 and 18 and provided with extensions 21 and 22 which surrounds, respectively, the gas inlet port 14 and the gas outlet port 15 of the lasing chamber 11. At least one and preferably a plurality of gas inlet ports 23–25 connected to a suitable header 26 or the like are provided intermediate the open ends 17 and 18 of the outer tube 16. The header 26 is connected to a source of gas (not shown). Flange or spacer rings 27 and 28 are carried by the lasing chamber and outer tube at their open ends 12–13 and 17–18 and spring-type spacers 29 or the like are also provided intermediate the open ends 12–13 and 17–18 of the lasing chamber and outer tube to maintain them in space relationship one with another. The lasing chamber may be provided in two parts and joined together with a slip fit as at 31 to compensate for differences in thermal expansion between the lasing chamber and outer tube. Flanges 32 and 33 provide a gas-tight seal between the gas ports 14 and 15 and the extensions 21 and 22. Transparent and non-reflective windows 34 and 35 such as, for example, Brewster angle plates, are disposed across, respectively, the open ends 12 and 13 of the lasing chamber and in combination with water cooled supporting rings 36 and 37 in which the windows are bonded, provide a gas-tight seal at the open ends of the lasing chamber and the outer tube. The windows 34 and 35 may, for example, be quartz flats which are also disposed at an angle of 34° (the Brewster angle for quartz) to the longitudinal axis of the lasing chamber. Coolant from any suitable source (not shown) may be circulated through and around the cooling rings 36 and 37 to maintain the quartz flats at a substantially constant temperature. All joints and connections should preferably be sealed to the ambient atmosphere to prevent contamination.

A pressure regulating valve 41 may advantageously be provided between the source (not shown) of gas coupled to the gas inlet ports 23–25 of the outer tube to control the gas pressure inside the outer tube. Further, a suitable and conventional exhausting pump (not shown) may be coupled to the gas outlet port 15 via a heat exchanger and flange 33 to maintain a pressure differential across the lasing chamber from its gas inlet port 14 to its gas outlet port 15. A conventional after-cooler or heat exchanger (also not shown) may be provided upstream of the pump to maintain the pumping efficiency.

Means such as, for example, as shown in FIGURE 2 is coupled via flange 32 to the gas inlet port 14 for supplying a thermally ionized gas to the lasing chamber. By way of example, a conventional continuously running high temperature arc chamber or an intermittently operating condenser-bank discharge chamber may be used.

A conventional assembly, designated generally by the numerals 42 and 43 including partially reflective mirrors 44 and 45, are provided adjacent each of the windows 34 and 35. The mirrors may be dielectric coated Fabry-Perot interferometer plates. Each assembly 42 and 43 is accurately adjustable in all directions as previously discussed to permit the selection of a desired distance between the mirrors 44 and 45 and to permit accurate adjustment of the mirrors to parallelism, i.e., accurate adjustment of each mirror so that it includes or is concentric about the longitudinal axis of the lasing chamber and is normal thereto.

The provision of and the adjustment and location of the mirrors, as well as the provision of suitable supporting means for the device to provide compensation for vibration, thermal expansion and the like, are well known by those skilled in the art, but nevertheless are critical. Accordingly, care is required in these areas. However, in order to relieve the exact requirements of location and orientation of the mirrors, confocal mirrors may be used. The provision of and use of confocal mirrors is equally well known by those skilled in the art. As is also well known in the art, in a practical arrangement of the invention, it is necessary that the inner tube and the mirrors be rigidly mounted one with respect to the other on a suitable base or frame that has practically zero coefficient of expansion to prevent misalignment of the device or the optical system during operation. The above-noted arrangements are all well known in the art and for this reason are not believed necessary to discuss them in any greater detail. See for example an article entitled, "Lasers," in the American Scientist, volume 51, No. 1, March 1963.

The mirrors are necessary when a device in accordance with the present invention is operated as a generator but are, of course, omitted when operated as an amplifier, the output of a suitable laser generator being directed through the lasing chamber along its longitudinal axis for the case of an amplifier.

Figure 4:
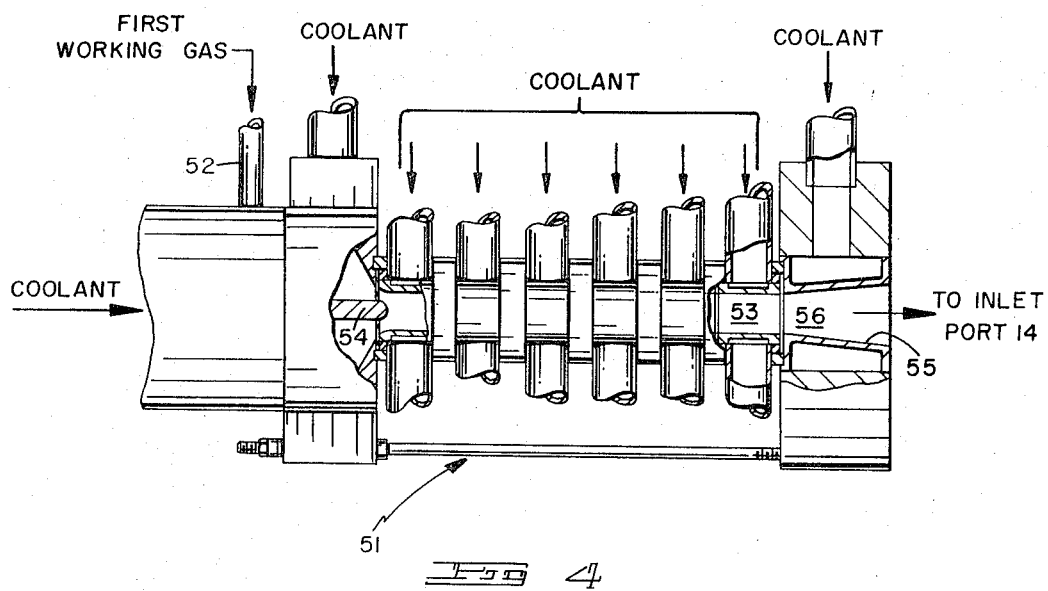
FIGURE 4 shows an arc plasma generator for ionizing the first working gas.

Directing attention now to FIGURE 4, there is shown, by way of example, a conventional arc plasma generator designated generally by the numeral 51 suitable for continuously thermally ionizing the gas supplied to the inlet port 14. Such a device is more fully described in an article entitled, "Poiseuille Plasma Experiment," in the Physics of Fluids, volume 5, No. 12, December 1962. Briefly, the gas is introduced via pipe 52 into the arc chamber 53 upstream of electrode 54. An arc is struck in conventional manner between the upstream electrode 54 and downstream electrode 55 at the outlet 56 of the arc chamber 53. As the gas flows past the upstream electrode 54 and then through the arc existing between electrodes 54 and 55, it is thermally ionized. Depending on the desired mode of operation, the ionized gas emerging from the arc chamber 53 may be either expanded through an expansion and cooling section (not shown) or directly supplied to the inlet port 14 of the lasing chamber. Cooling of the various components of the arc plasma generator 51 is accomplished in conventional manner.

It is advantageous to supply the first working gas to the lasing chamber at a high degree of ionization such as, for example, 50% or more since the degree of ionization essentially determines the efficiency of the device. Since at, for example, about 10% ionization, about one half of the energy input to the gas is ineffective for producing population inversion, such low values of ionization are not considered satisfactory for practical applications.

The type of or particular means utilized to ionize the first working gas is not considered critical. Accordingly, suitable ionizing means other than that shown and described may be used. The principal requirement in selecting an ionizing means for the first working gas is that its use does not result in substantial contamination of the first working gas. By way of example, preliminary contamination studies have shown that contamination levels of up to about one-half percent can be tolerated.

Many modes of operation are possible in accordance with the present invention, the particular mode depending on the choice of atomic system and the choice of gases supplied to the lasing chamber. Consider the following typical examples given by way of illustration.

For a resonance energy transfer atomic system, gas flow in accordance with the present invention may be either in the supersonic mode or the subsonic mode. Population inversion required for laser action in the resonance energy transfer atomic system is, as previously discussed, based on resonance energy transfer from a metastable atom of one gas to an upper electronic state of another or second gas, as in the case of the helium-neon system described in the aforementioned article entitled, "Population Inversion and Continuous Optical Maser Oscillation in a Gas Discharge Containing a He-Ne Mixture." In accordance with the present invention, a metastable carrier gas such as, for example, helium is thermally ionized and used as the first working gas and a cold gas such as, for example, neon is used as the second working gas.

In discussing the operation of the present invention in connection with the resonance energy transfer atomic system, the use of helium and neon will be assumed. However, it is to be understood that the present invention is not limited to the use of such gases and other suitable gases are known and may be used as noted previously. Broadly speaking, the first working gas, that is the gas that is thermally ionized and supplied to gas inlet port 14, must be capable of forming at least one metastable electronic state upon recombination between positive ions and free electrons in the gas as caused by the cooling effect of either expansion and/or mixing of a second cold working gas with the first working gas. The second working gas, when introduced into the lasing chamber, must be cold in the sense that there is no appreciable population of its upper electronic states initially, and must have at least one excited electronic state which is in energy resonance with one of the metastable states of the first working gas. Furthermore, the spontaneous emission lifetime of the aforementioned excited state of the second working gas must be longer than the spontaneous emission lifetime of a lower electronic state or states which in turn is optically connected to the aforementioned higher excited electronic state.

For operation in the supersonic mode, the first working gas such as, for example, helium supplied from any suitable reservoir, is heated by a high temperature arc such as, for example, the arc plasma generator 51 or a condenser bank discharge to a high degree of ionization. The ionization gas is then expanded rapidly through an expansion and/or cooling section and thereafter introduced into the lasing chamber via the gas inlet port 14. The pumping rate of the evacuating pump is adjusted so that the flow of the gas in the expansion and/or cooling section is supersonic. Due to the rapid cooling effect accompanying the supersonic expansion, the ions and free electrons in the ionized gas recombine to form metastable atoms as the gas flows through the gas inlet port 14. Upon entering the lasing chamber, these metastable atoms are continuously mixed with the second cold gas such as, for example, neon which is introduced through the foraminous or porous walls of the lasing chamber 11 from the gas inlet ports 23–25. During the mixing process, the excitation energy stored up in the metastable helium atoms is continuously transferred to the cold neon atoms to form highly excited neon atoms. In the cascading spontaneous emission processes that follow, an inverted population among the excited neon atoms is provided within the lasing chamber which, with the air of the optical system represented by mirrors 44 and 45, produce the desired laser action. After the mixing process is completed at the outlet end of the lasing chamber, the mixture of gases is exhausted through the gas outlet port by the exhausting pump.

The pressure in the lasing chamber may vary, for example, from about .1 mm. of Hg to 1 atmosphere. The gas pressure in the lasing chamber controls in part the power output of the device and the ratio of the working gases should be about 1 to 1. Since the ratio of gases is maintained at about 1 to 1, the specific porosity of the lasing chamber and/or the rate of gas flow therethrough is not critical since the selection of one of these parameters automatically determines the other parameters. For example, for a given rate of gas flow from the arc source, if the lasing chamber is not sufficiently porous for a given pressure of the second working gas, it is only necessary to increase this pressure to force a greater volume of gas through the walls of the lasing chamber to provide a gas ratio sufficient to produce lasing action.

For the subsonic mode, the first working gas is heated up to a high degree of ionization. However, the expansion and/or cooling chamber is eliminated and the ionizing means directly connected to the gas inlet port 14. The pumping rate of the evacuating pump is now adjusted so that the flow out of the ionizing means is subsonic. Upon entering the lasing chamber, the ionized helium gas is continuously mixed with the cold neon gas introduced through the porous walls of the lasing chamber in the manner previously described. Due to the cooling effect accompanying the mixing process, the helium ions again recombined with the free electrons to form metastable helium atoms which, in turn, transfer their excitation energy to neighboring neon atoms to provide the required inverted population for laser action.

It is believed that sufficient metastable atoms exist along the length of the lasing chamber for the following reasons. In the event that metastable atoms do not exist upon entry of the first working gas into the lasing chamber, as the ionized first working gas enters the lasing chamber, the inner portion of this gas will be at a temperature sufficient to maintain the ionized state of the gas whereas the outer portion of the gas will begin to mix with the cold second working gas and thereby provide metastable atoms through electron-ion recombination which will subsequently transfer their energy to the atoms of the second working gas. As the ionized first working gas progresses down the length of the lasing chamber, the ionized fraction of the first working gas decreases and the mixing zone within which generation of metastable atoms and resonance energy transfer to the second gas takes place increases. Accordingly, metastable atoms will be available for the lasing action substantially all along the length of the lasing chamber. Further, it can be shown that under typical operating conditions the probability that a metastable atom will transfer its energy to an atom of the second working gas is about 100 times greater than the probability that the metastable atom will strike a free electron and drop to the ground state.

The present invention is also suitable for producing population inversion based on an excited molecular system, and hence, molecular laser action, in a continuous flow system. A typical excited molecule system is based on the provision of an inverted population between an attractive upper electronic state such as, for example, the $^3\Sigma_g^+$ state of hydrogen and a repulsive lower electronic state such as, for example, the $^3\Sigma_u^+$ state of hydrogen.

Typically, for operation in this mode, molecular hydrogen may be used as the first working gas supplied to the gas inlet port of the lasing chamber and a noble gas of suitably high excitation energy such as, for example, helium may be used as the second working gas supplied to the gas inlet ports of the outer tube. Accordingly, the molecular hydrogen gas is heated in an arc plasma generator or the like to a high degree of dissociation and ionization. Thereafter, the dissociated and ionized gas is supplied directly to the gas inlet port of the lasing chamber and the evacuating pump is adjusted to provide operation in the subsonic mode. Upon entering the lasing chamber, the dissociated and ionized hydrogen is continuously mixed with cold (room temperature) helium introduced through the porous walls of the lasing chamber. From the cooling effect accompanying the mixing process, the dissociated and ionized hydrogen recombines to form excited $^3\Sigma_g^+$ molecules at such a high rate that the relative population between the $^3\Sigma_g^+$ and the $^3\Sigma_u^+$ states becomes inverted with respect to the local translational temperature of the gas mixture. Accordingly, this inverted population within the lasing chamber permits the desired molecular laser action.

As will now be apparent, an important feature of the present invention is the provision of a versatile method for the production of excited atom or molecule population inversion in a mixing flow system suitable for high power gas laser operation. Separation of the excitation region from the deexcitation (or population inversion) region minimizes the undesirable effect of repopulation of the intermediate and the lower energy states involved in the laser action by direct electron impact excitation from the ground state. Accordingly, the degree of population inversion provided in accordance with the present invention is greater than that obtainable by the earlier static method. Consequently, coherent light power output is greater than that obtainable by the earlier static method.

Attention is now directed to FIGURE 5 which shows an imperforate lasing chamber 61 composed of a material having a low coefficient of expansion such as, for example, Invar or the like, in combination with an ionizing chamber 62. The lasing chamber 61 is closed at its open ends by transparent and non-reflective windows 63 and 64 as and for the purposes disclosed in connection with FIGURE 3. A gas inlet port 65 is provided adjacent window 64 and a gas outlet port 66 is provided adjacent window 63. The cylindrical ionizing chamber 62 is comprised of a rotatable cylindrical tube 67 concentric about an electrode 68. The ionizing chamber 62 is preferably composed of the same material as the lasing chamber 61. The lasing chamber and the ionizing chamber are tangentially associated one with another as at 69 such that communication between the ionizing chamber and the lasing chamber is provided between ports 71 in tube 67 and the longitudinal slot 72 in the lasing chamber 61 when these ports and slot are in register one with another. Tube 67 of the ionizing chamber is rotatably driven by motor 73 through gear train 74. The ends of electrode 68 which extend the length of the ionizing chamber 62 are carried in bearings 75 and 76 which permit rotation of the tube 67 about electrode 68, provide a gas-tight seal and electrically insulate electrode 68 from tube 67. The inner and outer races 77 and 78 of the bearings as well as the rollers 79 may be formed of nylon and O rings 81 and 82 provide a gas-tight seal. Whereas the lasing chamber 61 is fixedly supported by member 83, the ionizing chamber 62 is rotatably carried in member 84 both of which members may be formed of copper and provided with passages (not shown) to receive a coolant maintain a constant operating temperature for high power operation. The first working gas, that is the gas to be ionized, is introduced into the ionizing chamber 62 through inlet port 85 and openings 86 and exhausted through openings 87 and exhaust port 88. If contamination of the first working gas in the ionizing chamber is sufficiently low, the exhaust port 88 and openings 87 may be omitted.

Ionization of the first working gas as and for the purposes previously disclosed in the ionizing chamber 61 may be simply accomplished by connecting electrode 68 and tube 67 to a suitable arc power supply 95 to provide a radial discharge between electrode 68 and tube 67. The speed of motor 73 and the discharge in the ionizing chamber 62 may be conveniently synchronized in any suitable manner as indicated by synchronizing means 96.

In operation, the first working gas, that is the gas to be ionized, is introduced into the ionizing chamber 62 and an electrical discharge effected between electrode 68 and tube 67 to ionize the gas in the ionizing chamber. Shortly after the gas in the ionized chamber has been ionized, rotation of tube 67 brings ports 71 into register with slot 72 to permit the ionized gas to enter the lasing chamber 61 all along its length and mix with the second working gas flowing therethrough. During the mixing process, metastable atoms of the first working gas are formed as a result of electron-ion recombination. These metastable atoms subsequently transfer their excitation energy to the cold second working gas to form highly excited atoms in the second working gas. In the cascading spontaneous emission processes that follow, an inverted population among the excited atoms of the second working gas is provided within the lasing chamber which, with the aid of an optical system, for example, produces the desired laser action. After the mixing process is completed, the mixture of gases is exhausted through the gas outlet port 66.

FIGURE 6 shows an alternate arrangement for introducing the first working gas into the ionizing chamber. In this embodiment, the first working gas is introduced into the ionizing chamber through a hollow electrode 101 provided with passages 102. Again, if contamination is sufficiently low, the exhaust port 88 may be omitted. As is also the case in FIGURE 5, the gas in the ionizing chamber is ionized in synchronism with the rotation of tube 67. Accordingly, ports 71 in the tube 67 are opened a short time after the arc is struck in the ionizing chamber.

FIGURE 7 illustrates a further modification of the synchronized pulsed laser illustrated in FIGURES 5 and 6. As shown in FIGURE 7, the ionizing and lasing chambers are concentric about a common axis. In this arrangement, the ionizing chamber 62 surrounds the lasing chamber 61 and oppositely disposed ports or slots 71 in the lasing chamber are synchronously opened such as, for example, by rotation of tube 111 which also contains oppositely disposed ports or slots 112 to permit the ionized first working gas in the ionizing chamber 62 to be uniformly introduced into the lasing chamber 61.

A still further modification of the synchronized pulsed laser illustrated in FIGURES 5 and 6 is shown in FIGURE 8. As shown in FIGURE 8, the ionizing chamber 62 and lasing chamber 61 are integrally connected along their length by a central portion 115 adapted to rotatably receive a shaft 116 provided along its length with ports or a slot 117. The first working gas is introduced into the ionizing chamber 62 through hollow electrode 101 provided with passages 102 as previously described and after ionization of the gas in the ionizing chamber, at least a part of the ionized gas is introduced into the lasing chamber 61 through ports 117 by reason of pressure in the ionizing chamber. The provision of a rotary valve as shown in FIGURE 8, for example, is attractive because of its simplicity and ease of construction. The ionizing chamber need not be cylindrical as shown and other well-known electrode arrangements and/or dispositions may be used. The volume of the ionizing chamber is preferably substantially the same as that of the lasing chamber. Further, the total area of ports 117 (as well as ports 71 of FIGURE 5 and FIGURE 6) are selected to permit equalization of the pressure in the ionizing and lasing chambers during the time that these ports are open. As will now be evident, the present invention is not limited to that shown and described and may be carried out with significantly different apparatus as will be evident from inspection of FIGURES 2–8.

The various features and advantages of the invention are thought to be clear from the foregoing description. Various other features and advantages not specifically enumerated will undoubtedly occur to those versed in the art, as likewise will many variations and modifications of the embodiment of the invention illustrated, all of which may be achieved without departing from the spirit and scope of the invention as defined by the following claims.

I claim:
1. The method of providing population inversion in a laser chamber having oppositely disposed transparent and nonreflective ends, comprising:
 (a) providing in said chamber an ionized first gas containing metastable ions;
 (b) mixing a second un-ionized gas with said first gas in said chamber, said second gas having a plurality of electronic states one of which is resonantly coupled to said metastable ions and has an energy level and spontaneous lifetime greater than the said other states; and
 (c) exhausting said first and second gases from said chamber subsequent to the mixing thereof.

2. The method of providing population inversion in a laser chamber having oppositely disposed transparent and nonreflective ends, comprising:
 (a) providing in said chamber an ionized first gas for forming a metastable electronic state upon recombination between the positive ions and the electrons in said gas;
 (b) mixing with said first gas in said chamber an un-ionized second gas having a plurality of excited electronic states one of which is in energy resonance with the metastable state of said first gas and an energy level greater than that of said other states; and
 (c) exhausting said first and second gases from chamber subsequent to the mixing thereof.

3. The method of providing population inversion in an elongated laser chamber having oppositely disposed transparent and nonreflective ends, comprising:

(a) ionizing a first gas for forming a metastable electronic state upon recombination between the positive ions and the electrons in said gas;

(b) introducing said ionized first gas into said chamber;

(c) uniformly mixing with said first gas in said chamber an un-ionized second gas having a first excited electronic state and a second higher excited electronic state which is in energy resonance with the metastable state of said first gas and which has a spontaneous emission lifetime longer than that of said first state; and (d) exhausting said first and second gases from said chamber subsequent to the mixing thereof.

4. The method of providing population inversion in an elongated laser chamber having oppositely disposed transparent and nonreflective ends, comprising:

(a) thermally ionizing a first gas for forming a metastable electronic state upon recombination between the positive ions and the electrons in said gas;

(b) introducing said ionized first gas into said chamber adjacent one end thereof;

(c) introducing into said chamber a second un-ionized gas downstream of the point of introduction of said first gas to achieve mixing of said gases along the length of said chamber, said second gas having a first excited electronic state and a second higher excited electronic state which is in energy resonance with the metastable state of said first gas and which has a spontaneous emission lifetime longer than that of said first state; and (d) exhausting said first and second gases adjacent the other end of said chamber subsequent to the mixing thereof.

5. The method of providing population inversion in an elongated laser chamber having oppositely disposed transparent and nonreflective ends, comprising:

(a) thermally ionizing a first gas for forming a metastable electronic state upon recombination between the positive ions and the electrons in said gas;

(b) continuously introducing said ionized first gas into said chamber adjacent one end thereof;

(c) continuously introducing into said chamber a second un-ionized gas downstream of the point of introduction of said first gas to achieve mixing of said gases along the length of said chamber, said second gas having a first excited electronic state and a second higher excited electronic state which is in energy resonance with the metastable state of said first gas and which has a spontaneous emission lifetime longer than that of said first state; and (d) continuously exhausting said first and second gases adjacent the other end of said chamber subsequent to the mixing thereof.

6. The method of providing population inversion in a laser chamber having oppositely disposed transparent and nonreflective ends, comprising:

(a) ionizing a first gas that will form a metastable electronic state upon recombination between the positive ions and the electrons in said gas;

(b) expanding said ionized first gas into said chamber to produce said metastable electronic state in said chamber;

(c) introducing into said chamber and mixing a second gas with said first gas, said second gas having first and second electronic states, at least one of which states is resonantly coupled to the formed metastable state of said first gas, is at a higher emission level than the other of the two states, and has a spontaneous emission lifetime greater than the other of said states; and (d) exhausting said first and second gases from said chamber subsequent to the mixing thereof.

No references cited.

JEWELL H. PEDERSEN, *Primary Examiner.*

RONALD L. WIBERT, *Examiner.*